US011059950B2

(12) United States Patent
Holzschuh et al.

(10) Patent No.: US 11,059,950 B2
(45) Date of Patent: Jul. 13, 2021

(54) DIPPING BATH COMPOSITIONS FOR TREATING REINFORCING INSERTS

(71) Applicant: EMS-PATENT AG, Domat/Ems (CH)

(72) Inventors: Martin Holzschuh, Domat/Ems (CH); Andreas Kaplan, Chur (CH)

(73) Assignee: EMS-Patent AG, Domat/Ems (CH)

( * ) Notice: Subject to any disclaimer, the term of this patent is extended or adjusted under 35 U.S.C. 154(b) by 7 days.

(21) Appl. No.: 16/515,119

(22) Filed: Jul. 18, 2019

(65) Prior Publication Data
US 2020/0024415 A1 Jan. 23, 2020

(30) Foreign Application Priority Data

Jul. 19, 2018 (EP) .................... 18184505

(51) Int. Cl.
C08J 7/04 (2020.01)
B05D 1/18 (2006.01)
C08G 18/54 (2006.01)
C08G 18/80 (2006.01)
B60C 1/00 (2006.01)
C08G 18/76 (2006.01)
C09J 175/00 (2006.01)
C08K 5/29 (2006.01)
C08L 61/12 (2006.01)
B29D 30/06 (2006.01)
B29D 30/00 (2006.01)
C09J 11/06 (2006.01)

(52) U.S. Cl.
CPC .............. C08J 7/0427 (2020.01); B05D 1/18 (2013.01); B29D 30/0061 (2013.01); B29D 30/0603 (2013.01); B60C 1/00 (2013.01); C08G 18/542 (2013.01); C08G 18/7664 (2013.01); C08G 18/8061 (2013.01); C08G 18/8074 (2013.01); C08K 5/29 (2013.01); C08L 61/12 (2013.01); C09J 11/06 (2013.01); C09J 175/00 (2013.01); B60C 1/0041 (2013.01); B60C 2001/0066 (2013.01); B60C 2001/0083 (2013.01); C08G 2170/80 (2013.01); C09J 2301/312 (2020.08)

(58) Field of Classification Search
CPC ..... B05D 1/18; B60C 1/00; B60C 2001/0083; B60C 2001/0066; B60C 1/0041; B29D 30/0603; B29D 30/0061; C08G 18/542; C08G 18/8061; C08G 18/7664; C08G 18/8074; C08G 2170/80; C08J 7/0427; C08K 5/29; C08L 61/12; C09J 175/00; C09J 11/06; C09J 2301/312
See application file for complete search history.

(56) References Cited

U.S. PATENT DOCUMENTS

| 6,482,889 | B1 | 11/2002 | Kurz |
| 7,973,191 | B2 | 7/2011 | Döring et al. |
| 8,765,260 | B2 | 7/2014 | Laufer et al. |
| 8,993,662 | B2 | 3/2015 | Kaplan |
| 9,359,532 | B2 | 6/2016 | Kaplan |
| 10,047,054 | B2 | 8/2018 | Kaplan |
| 2006/0280942 | A1* | 12/2006 | Watanabe ............. D06M 13/02 428/375 |
| 2010/0069657 | A1 | 3/2010 | Döring et al. |
| 2010/0168423 | A1 | 7/2010 | Döring et al. |
| 2012/0100290 | A1 | 4/2012 | Laufer et al. |
| 2012/0115993 | A1 | 5/2012 | Kaplan |
| 2014/0135458 | A1 | 5/2014 | Kaplan |
| 2015/0051343 | A1 | 2/2015 | Kaplan |
| 2015/0126701 | A1 | 5/2015 | Liedloff et al. |

FOREIGN PATENT DOCUMENTS

| EP | 1 038 899 A1 | 9/2000 |
| EP | 2 423 186 A1 | 2/2012 |
| EP | 2 450 389 A1 | 5/2012 |

OTHER PUBLICATIONS

U.S. Appl. No. 12/540,007, filed Aug. 12, 2009.
U.S. Appl. No. 12/539,972, filed Aug. 12, 2009.
U.S. Appl. No. 13/290,718, filed Nov. 7, 2011.
U.S. Appl. No. 14/078,134, filed Nov. 12, 2013.
U.S. Appl. No. 14/221,930, filed Mar. 21, 2014.
U.S. Appl. No. 14/397,529, filed Oct. 28, 2014.
U.S. Appl. No. 16/515,151, filed Jul. 18, 2019.
European Patent Office, Extended European Search Report in European Patent Application No. 18 184 505.8 (dated Feb. 4, 2019).

* cited by examiner

*Primary Examiner* — Patrick D Niland
(74) *Attorney, Agent, or Firm* — Leydig, Voit & Mayer, Ltd.

(57) ABSTRACT

The present invention relates to an aqueous, solids-containing dipping bath composition for treating reinforcing inserts for rubber products comprising the following components or consisting of these components, (A) at least one blocked MDI mixture, the MDI mixture comprising MDI oligomers of formula (I), n being a whole number from 1 to 8, and MDI monomers; (B) at least one resorcinol-formaldehyde latex; and (C) possibly at least one additive, wherein the dipping bath composition is essentially free of epoxides.

Formula (I)

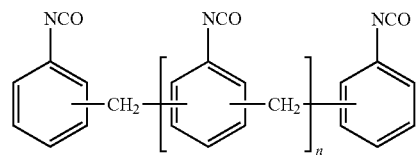

17 Claims, No Drawings

DIPPING BATH COMPOSITIONS FOR TREATING REINFORCING INSERTS

CROSS-REFERENCE TO A RELATED APPLICATION

This patent application claims the benefit of European Patent Application No. 18 184 505.8, filed on Jul. 19, 2018, the disclosure of which is incorporated herein by reference in its entirety for all purposes.

BACKGROUND OF THE INVENTION

The present invention relates to dipping bath compositions for treating reinforcing inserts and use thereof for producing reinforced rubber products. In addition, the present invention relates to methods for producing an adhesive reinforcing insert.

In the production of reinforced rubber products, it has proved advantageous if, for improving the adhesion, an adhesive is used between reinforcing insert and the rubber. Such an adhesive is important in particular in the field of tyre cord as reinforcing insert and in other highly-loaded composite materials with reinforcing fibres. In particular for application in the tyre cord field, it has become known to use resorcinol-formaldehyde latex systems (RFL) for connecting synthetic fibres to rubber products.

Adhesives for producing adhesive reinforcing inserts are already known from the state of the art.

EP 1 038 899 A 1 describes an adhesive for treating reinforcing inserts for producing reinforced rubber products in the form of an aqueous dispersion. The adhesive is thereby based on isocyanates.

EP 2 450 389 A 1 relates to a pulverulent adhesive which is dispersible in water for textile reinforcing inserts for producing reinforced rubber products.

The adhesive thereby comprises an at least partially blocked, low-molecular isocyanate, a surfactant, a binder and also if necessary further additives.

The dipping baths known from the state of the art comprise epoxides in order to achieve adhesion properties. The use of epoxides in dipping baths entails however some disadvantages. On the one hand, epoxides cause foaming of the dipping bath compositions, it is therefore necessary to add defoamers. On the other hand, the storability of the dipping bath compositions is reduced by the addition of epoxides. Furthermore, the solution of epoxides requires high shearing forces and demands a great deal of time. Incomplete dissolving of the epoxides leads to defects in the coating of the reinforcing insert and hence to adhesion problems. Without the addition of epoxides it is however impossible, using the dipping baths known from the state of the art, to produce reinforced rubber products which have good adhesion properties, in particular good peel adhesion and a good degree of surface covering after the peel adhesion test.

Starting therefrom, it was the object of the present invention to provide a dipping bath composition which makes it possible to produce reinforced rubber products which have very good adhesion properties, in particular very good peel adhesion and a good degree of surface covering after the peel adhesion test, without the above-discussed problems—resulting from the use of epoxides—occurring. This object is achieved by the aqueous, solids-containing dipping bath composition according to the invention for treating reinforcing inserts, which comprises the following components or consists of these components:

(A) at least one blocked methylene diphenyl isocyanate mixture (MDI mixture),
the MDI mixture comprising MDI oligomers of formula (I), n being a whole number from 1 to 8,

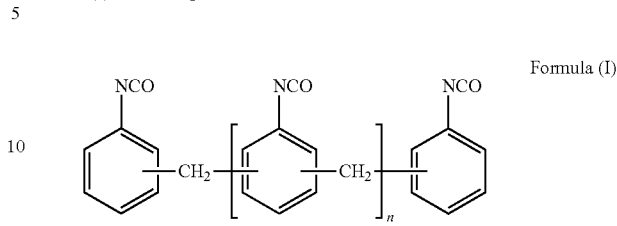

Formula (I)

and MDI monomers;
(B) at least one resorcinol-formaldehyde latex; and
(C) possibly at least one additive;
wherein the dipping bath composition is essentially free of epoxides.

Further preferred embodiments of the dipping bath composition according to the invention are described herein.

A method for producing an adhesive reinforcing insert and preferred embodiments of this method are also described herein.

Further, an adhesive reinforcing insert, producible according to the method according to the invention and the use of this adhesive reinforcing insert for producing reinforced rubber products are also described herein.

Lastly, the use of the dipping bath composition according to the invention for coating reinforcing inserts for rubber products is described herein.

Terminology Definitions

The term "blocked" in the sense of the present invention means a reversible blocking of the isocyanate function. A complete blocking, which is achieved by using the blocking means in hyperstoichiometric quantities, is thereby preferred.

The dipping bath compositions according to the invention are aqueous, i.e. water is used as liquid phase. Water is not listed in the following as component of the dipping bath composition. Preferably, the dipping bath composition is essentially free of organic solvents, i.e. of organic liquids which do not participate in the reactions. Essentially free means that there are contained less than 5% by weight, preferably less than 2% by weight, of organic solvents, relative to the total weight of the dipping bath composition. Preferably, the dipping bath composition is completely free of organic solvents.

Furthermore, the dipping bath composition according to the invention is essentially free of epoxides, i.e. there are contained less than 0.7% by weight, preferably less than 0.4% by weight, particularly preferably less than 0.16% by weight of epoxides, relative to the total weight of the dipping bath composition. Preferably, the dipping bath compositions are completely free of epoxides.

The MDI mixture according to the present invention comprises components (i), (ii) and possibly (iii) or preferably consists exclusively of these, the proviso applies thereby that components (i), (ii) and (iii) add up in total to 100% by weight. The fixed ranges of the quantity data for the individual components (i), (ii) and (iii) should be understood such that, within the prescribed ranges, an arbitrary quantity can be selected for each of the individual components provided the strict proviso is fulfilled that the sum of all the components (i) to (ii) produces 100% by weight.

The terms "comprising" and "including" in the present claims and in the description mean that further components are not excluded. Within the scope of the present invention, the term "consisting of" should be understood as preferred embodiment of the terms "comprising" or "including". If it is defined that a group "comprises" at least a specific number of components or "includes" these, this should also be understood such that a group is disclosed which "consists" preferably of these components.

Dipping Bath Composition

In the following, preferred embodiments of the dipping bath composition according to the invention are indicated.

According to a preferred embodiment of the present invention, the solids proportion of the dipping bath composition is 2 to 40% by weight, preferably 3 to 30% by weight and particularly preferably 5 to 27% by weight, relative to the total weight of the dipping bath composition.

Another preferred embodiment provides that the aqueous solids-containing dipping bath composition has the following composition, the parts by weight respectively relating to the total weight of the dipping bath composition:
  (A) 0.1 to 20 parts by weight, preferably 0.2 to 10 parts by weight and particularly preferably 1 to 8 parts by weight,
  (B) 5 to 200 parts by weight, preferably 15 to 175 parts by weight and particularly preferably 25 to 150 parts by weight, and
  (C) 0 to 20 parts by weight, preferably 0.1 to 10 parts by weight and particularly preferably 0.1 to 3 parts by weight.

According to another preferred embodiment of the present invention, the blocked MDI mixture (A) comprises MDI derivatives which are selected preferably from the group consisting of MDI uretdione, adducts of MDI and/or MDI oligomers with other compounds, preferably with polyethylene glycol and mixtures hereof.

A further preferred embodiment of the present invention provides that the MDI is selected from the group consisting of 4,4'-MDI, 2,4'-MDI, 2,2'-MDI and mixtures hereof, the proportion of 2,4'-MDI and 2,2'-MDI being less than 10% by weight, preferably less than 8% by weight and particularly preferably the proportion of 2,4'-MDI and 2,2'-MDI being from 0.1 to 6% by weight, relative to the MDI mixture, particularly preferably the mixture comprising one or more MDI oligomers, n in formula (I) being a whole number from 1 to 8 and preferably from 1 to 6.

According to another preferred embodiment according to the invention, the MDI mixture has the following composition:
  (i) 25 to 60% by weight, preferably 25 to 49.9% by weight, of MDI monomers;
  (ii) 40 to 75% by weight, preferably 50 to 74.9% by weight, of MDI oligomers; and
  (iii) 0 to 9% by weight, preferably 0.1 to 6% by weight, of MDI derivatives;
the proportions of components (i) to (iii) adding up to 100% by weight.

MDI mixtures of MDI oligomers of formula (I), MDI monomers and possibly MDI derivatives are commercially available with the name "polymeric MDI" (PMDI), e.g. as Voronate (DowDuPont), Suprasec (Huntsman), Elastoflex (BASF), Lupronat (BASF) or Autofroth (BASF).

According to a further preferred embodiment of the present invention, in the case of the at least one resorcinol-formaldehyde latex (B), the latex is selected from the group consisting of styrene-butadiene-vinylpyridine copolymer, styrene-butadiene-vinylpyridine copolymer modified with carboxylic acid, styrene-butadiene copolymer, styrene-butadiene copolymer modified with carboxylic acid, nitrile-butadiene copolymer, natural latex, chloroprene latex and mixtures hereof.

A further preferred embodiment of the present invention provides that the at least one additive (C) is selected from the group consisting of surfactants, defoamers, fillers, colourants, preservatives, thickening agents, acids, lyes, multivalent alcohols and mixtures hereof.

According to a further preferred embodiment of the present invention, the MDI mixture (A) is blocked with a compound which is selected from the group consisting of monophenols in particular phenol, cresol, trimethylphenols and tert.-butylphenols, lactams, in particular ε-caprolactam, δ-valerolactam and laurinlactam, oximes, in particular methylethylketoxime, methylamylketoxime and cyclohexanone oxime, enol-forming compounds, in particular acetic acid ester, acetyl acetone and also mixtures hereof. Preferably, the blocking means is selected from the group consisting of monophenols, in particular phenol, cresol, trimethylphenols and tert.-butylphenols, lactams, in particular ε-caprolactam, δ-valerolactam and laurinlactam and mixtures hereof and particularly preferably the blocking means is selected from the group consisting of phenol, ε-caprolactam and mixtures hereof. Most preferably, the MDI mixture (A) is blocked with ε-caprolactam.

A further preferred embodiment of the present invention provides that the average particle diameter $d_{50}$ of the blocked MDI mixture is at most 2 μm; preferably 0.6 to 1.5 μm.

According to another preferred embodiment of the present invention, the particle diameter $d_{100}$ of the blocked MDI mixture is at most 6 μm; preferably 0.6 to 5 μm.

According to a further preferred embodiment of the present invention, the blocked MDI mixture has a number-average molar mass $M_n$ in the range of 550 to 1,200 g/mol and preferably of 700 to 1,100 g/mol.

Method for Producing an Adhesive Reinforcing Insert

The present invention relates in addition to a method for the production of an adhesive reinforcing insert which comprises at least the following steps:
  a) providing at least one reinforcing insert;
  b) dipping the prepared reinforcing insert in at least one dipping bath composition according to the invention as defined above;
  c) drying the reinforcing insert from step b) at 100 to 240° C.;
  d) annealing the coating of the reinforcing insert from step c) at 200 to 250° C.

In the following, preferred embodiments of the method according to the invention for the production of an adhesive reinforcing insert are indicated.

According to a preferred embodiment of the present invention, step c) is effected at temperatures of 110 to 210° C. and preferably of 140 to 180° C.

According to a further embodiment of the present invention, step d) is effected at temperatures of 220 to 240° C.

A further preferred embodiment of the present invention provides that the reinforcing insert is selected from a compound from the group consisting of polyamide 6, polyamide 66, polyethylene terephthalate, polyethylene naphthalate, rayon, aramide, cotton, basalt fibres, sisal, hemp, flax, coconut fibres and mixtures hereof.

According to another preferred embodiment of the present invention, the reinforcing insert is dipped, before step b), in an aqueous solids-containing dipping bath composition which comprises at least one blocked MDI mixture and which comprises preferably no other components, the MDI mixture comprising MDI oligomers of formula (I), n being a whole number from 1 to 8,

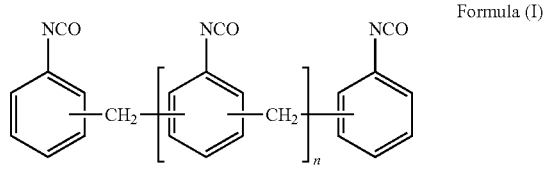

Formula (I)

and MDI monomers. After the dipping step, it is preferred that the drying and annealing of the layer is effected under the above-indicated conditions before step b) of the method according to the invention is implemented. Preferably, the drying is effected at temperatures of 110 to 210° C. and particularly preferably of 140 to 180° C. Furthermore, it is thereby preferred that the drying is implemented over a time period of 30 to 120 minutes. Furthermore, the annealing is implemented at temperatures of 220 to 240° C. Furthermore, it is thereby preferred that the annealing is implemented over a time period of 20 to 120 minutes.

For producing a dipping bath, firstly deionised water is placed in a vessel, preferably in an agitated vessel, at room temperature, and thereafter components (A), (B) and possibly (C) are stirred in.

The tyre cord is coated in a conventional coating unit, the excess proportion of the dipping bath being removed with the help of a mechanical device and/or a vacuum suction at 1 to 5 mbar and the coating being dried firstly in an oven for 20 to 120 s at 100 to 240° C. and subsequently being annealed in a further oven for 20 to 120 s at 200 to 250° C.

Method for Producing a Reinforced Rubber Product

The present invention relates in addition to a method for the production of a reinforced rubber product which comprises the following steps:
(i) providing at least one layer of an adhesive reinforcing insert produced via the method according to one of the claims 10 to 12;
(ii) embedding at least one layer of an adhesive reinforcing insert from step (i) in a rubber matrix in a pressing mould;
(iii) pressing the layers from step (ii);
(iv) vulcanising the reinforced rubber product from step (iii) at 140 to 210° C. and 5 to 110 bar for 5 to 45 minutes;
(v) removing the reinforced rubber product from step (iv) from the pressing mould.

According to a preferred embodiment of the present invention, the reinforced rubber products concern tyres, both for cars, motorcycles and for commercial vehicles and aircraft and technical rubber products, in particular conveyor belts, pneumatic springs, hoses and driving belts, e.g. V-belts, V-ribbed belts, round belts, flat belts or toothed belts.

Adhesive Reinforcing Insert

Furthermore, the present invention relates to an adhesive reinforcing insert which is producible according to the method according to the invention. Preferably, the adhesive reinforcing insert concerns a tyre cord.

Uses

In addition, the present invention relates to the use of the adhesive reinforcing insert according to the invention for the production of reinforced rubber products.

Furthermore, the present invention relates to the use of the dipping bath composition according to the invention for coating reinforcing inserts for rubber products.

The reinforced rubber products concern preferably tyres, both for cars and motorcycles and for commercial vehicles and aircraft and technical rubber products, in particular conveyor belts, pneumatic springs, hoses and driving belts, e.g. V-belts, V-ribbed belts, round belts, flat belts or toothed belts.

The subject according to the invention is intended to be explained in more detail with reference to the subsequent examples without wishing to restrict said subject to the specific embodiments shown here.

1 Measuring Methods

Within the scope of this application, the following measuring methods were used.

Particle Diameter ($d_{50}$ or $d_{100}$ Value)

The particle diameter was determined on a powder or on an aqueous dispersion according to ISO 13320 at 23° C. by means of laser diffraction. The laser measurements were implemented with a granulometer Cilas 1064 of Quantachrome GmbH (Germany).

Peel Adhesion

The peel adhesion was determined according to ASTM 4393. For this purpose, eight-layer test pieces with a symmetrical construction (2 layers of cord (=adhesive reinforcing insert)) and 6 layers of rubber, cf. FIG. 2, ASTM 4393) were produced. The tensile test was effected at a measuring temperature of 23° C. with a tensile speed of 20 mm/min. The tensile test was evaluated according to Option 1 of ASTM 4393. As rubber, the GB rubber of the company Wuxi Segen Rubber Tech. Co., Ltd, China (thickness 0.4 mm) was used. The vulcanisation was effected under three different conditions, 160° C., 100 bar for 12.5 minutes, 170° C., 100 bar for 15 minutes and 170° C., 100 bar for 30 minutes.

Degree of Surface Covering

The degree of surface covering after the peel adhesion test was determined by a visual examination by the corresponding tyre material being compared with internal patterns which had a covering of 0 to 100%. A covering of 0% means that the adhesive reinforcing insert has detached completely from the rubber after the peel adhesion test, i.e. the breakage was effected in the boundary layer between tyre cord and rubber. A covering of 100% means conversely that no detachment of the adhesive reinforcing insert from the rubber was effected, i.e. the breakage was effected in the rubber.

Solids Content

The solids content is determined by evaporation in a halogen drier (Mettler Halogen drier HR 73). For this purpose, approx. 3 g of the dipping bath composition is distributed uniformly on the shell base in an aluminium shell (diameter: 95 mm). The test duration is 25 minutes at 80° C. In the case of the type of display, the dry type "dry content (100-0)" is chosen. The average of three determinations is indicated.

Number-Average Molar Mass (Mn)

Determination of the number-average molar mass (Mn) is effected by means of GPC (gel permeation chromatography) with UV detection.

For measurement, the samples are dissolved in THF (approx. 5 mg in 10 ml) and filtered into vials through disposable injection filters before filling.
Device: Waters 2690 Alliance
Software: Waters Millenium 32 GPC Module
Column: PLgel 100 Å, particle size 3 μm
Length 30.0 cm
Inner diameter 7.5 mm
Wavelength UV detector: 254 nm
Eluent: THF
Flow rate: 1.0 ml/min The number-average molar mass (Mn) is determined with conventional calibration. The calibration is effected with polystyrene standards (masses 700, 1,100 and 2,000) and also laurinlactam (mass 197). Three determinations are implemented. The arithmetic mean of the molar mass is indicated in g/mol. The solvent THF with HPLC quality was obtained from EGT Chemie Switzerland. The disposable filters are obtainable at Macherey-Nagel GmbH & Co. KG, Germany, with the name Chromafil A-45/25 (pore size 0.45 μm, filter diameter 25 mm). The disposable syringes are obtainable at VWR International GmbH, Germany.

2 Starting Materials

The materials used in the examples and comparative examples are compiled in table 1.

TABLE 1

| Materials used in the examples and comparative examples | |
|---|---|
| CL-blocked MDI mixture (A1) | Aqueous dispersion of MDI mixture blocked with ε-caprolactam and surfactant[a] <br> Solids content: 50% by weight <br> Number-average molar mass $M_n$ of the MDI mixture blocked with ε-caprolactam: 740 g/mol <br> Volume-average particle diameter: $d_{50}$ = 1.2 μm, $d_{100}$ = 3.6 μm <br> Manufacturer: EMS-CHEMIE AG, Switzerland |
| CL-blocked low-molecular diisocyanate (A2) | Aqueous dispersion of 4,4'-diphenylmethane diisocyanate blocked with ε-caprolactam and surfactant <br> Solids content: 60% by weight <br> Number-average molar mass of 4,4'-diphenylmethane diisocyanate blocked with ε-caprolactam: 477 g/mol <br> Volume-average particle diameter: $d_{50}$ = 0.9 μm, $d_{100}$ = 3.0 μm <br> Manufacturer: EMS-CHEMIE AG, Switzerland |
| RFL (B) | Aqueous dispersion of resorcinol, formaldehyde, styrene-butadiene-vinylpyridine latex <br> Weight ratio 1.0:0.6:9.2 <br> Solids content: 20% by weight <br> Manufacturer: EMS-CHEMIE AG, Switzerland |
| Epoxide | Glycerol triglycidyl ether, liquid <br> Manufacturer: EMS-CHEMIE AG, Switzerland |
| Defoamer | Mineral oil-based defoamer, liquid <br> Trade name: Surfynol DF-220 <br> Manufacturer: Air Products and Chemicals Inc., USA |

[a] The production of the blocked MDI mixture (A1) was effected by blocking the product "Voronate M600" obtainable from DowDuPont with ε-caprolactam.

A polyester cord (1670×1×2 dtex, ZS 380, 1×50) of the company Longlaville Performance Fibers SAS was used as substrate.

As coating unit, a pilot unit of Mehler Engineering & Service GmbH, Fulda, Germany was used.

3 Examples and Comparative Examples

In the following table 2, the results of the example and of the comparative examples according to the present invention are compiled.

TABLE 2

Examples and comparative examples.

| | | Example | Comparative examples | |
|---|---|---|---|---|
| | Unit | 1 | 2 | 3 |
| Components | | | | |
| CL-blocked MDI mixture (A1), Solids content 50% by weight | Parts by weight | 5 | — | — |
| CL-blocked diisocyanate (A2), Solids content 60% by weight | Parts by weight | — | 4.2 | 4.2 |
| RFL (B), Solids content 20% by weight | Parts by weight | 100 | 100 | 100 |
| Epoxide, liquid | Parts by weight | — | — | 1.05 |
| Defoamer, liquid | Parts by weight | — | — | 0.2 |
| Water, deionised | Parts by weight | 95 | 95.8 | 94.55 |
| Solids content of the dipping bath composition | % by weight | 11.3 | 11.3 | 11.9 |
| Measurements | | | | |
| Peel adhesion | N/inch | | | |
| 160° C., 12.5 min, 100 bar | | 301 | 90 | 232 |
| 170° C., 15 min, 100 bar | | 242 | 75 | 191 |
| 170° C., 30 min, 100 bar | | 199 | 60 | 143 |
| Degree of surface covering | % | | | |
| 160° C., 12.5 min, 100 bar | | 20 | 0 | 7 |
| 170° C., 15 min, 100 bar | | 50 | 0 | 12 |
| 170° C., 30 min, 100 bar | | 38 | 0 | 7 |

4 Discussion of the Results

The tyre cord according to the invention and illustrated in table 2 shows throughout a higher peel adhesion and a higher degree of surface covering than the tyre cords according to comparative examples 2 to 3 displayed in table 2. It is thereby noteworthy that, by using the dipping bath according to the invention, in fact even better adhesion properties and degrees of surface covering were achieved than was possible by the addition of epoxides.

The invention claimed is:

1. An aqueous, solids-containing dipping bath composition for treating reinforcing inserts for rubber products comprising the following components:
   (A) at least one blocked MDI mixture,
   the MDI mixture comprising MDI oligomers of formula (I), n being a whole number from 1 to 8,

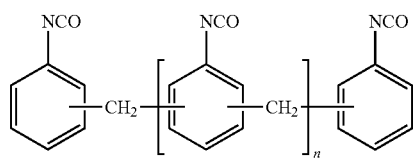

Formula (I)

and MDI monomers;
   (B) at least one resorcinol-formaldehyde latex; and
   (C) optionally at least one additive,
   wherein the dipping bath composition is essentially free of epoxides.

2. The aqueous, solids-containing dipping bath composition according to claim 1, wherein the proportion of the solids is 2 to 40% by weight relative to the total weight of the dipping bath composition.

3. The aqueous, solids-containing dipping bath composition according to claim 1, wherein the bath has the following composition, the parts by weight respectively relative to the total weight of the dipping bath composition:
   (A) 0.1 to 20 parts by weight,
   (B) 5 to 200 parts by weight, and
   (C) 0 to 20 parts by weight.

4. The aqueous, solids-containing dipping bath composition according to claim 1, wherein the blocked MDI mixture (A) comprises MDI derivatives selected from the group consisting of MDI uretdione, adducts of MDI, and MDI oligomers with other compounds.

5. The aqueous, solids-containing dipping bath composition according to claim 4, wherein the MDI is selected from the group consisting of 4,4'-MDI, 2,4'-MDI, 2,2'-MDI and mixtures thereof, the proportion of 2,4'-MDI and 2,2'-MDI being less than 10% by weight, relative to the MDI mixture.

6. The aqueous, solids-containing dipping bath composition according to claim 1, wherein the MDI mixture has the following composition:
   (i) 25 to 60% by weight of MDI monomers;
   (ii) 40 to 75% by weight of MDI oligomers; and
   (iii) 0 to 9% by weight of MDI derivatives;
   the proportions of components (i) to (iii) adding up to 100% by weight.

7. The aqueous, solids-containing dipping bath composition according to claim 1, wherein:
   in the case of the at least one resorcinol-formaldehyde latex (B), the latex is selected from the group consisting of styrene-butadiene-vinylpyridine copolymer, styrene-butadiene-vinylpyridine copolymer modified with carboxylic acid, styrene-butadiene copolymer, styrene-butadiene copolymer modified with carboxylic acid, nitrile-butadiene copolymer, natural latex, chloroprene latex, and mixtures thereof.

8. The aqueous, solids-containing dipping bath composition according to claim 1, wherein the at least one additive (C) is selected from the group consisting of surfactants, defoamers, fillers, colourants, preservatives, thickening agents, acids, lyes, multivalent alcohols, and mixtures thereof.

9. The aqueous, solids-containing dipping bath composition according to claim 1, wherein the MDI mixture (A) is blocked with a compound which is selected from the group consisting of monophenols, lactams, oximes, enol-forming compounds, acetyl acetone, and mixtures thereof.

10. The aqueous, solids-containing dipping bath composition according to claim 1, wherein:
    the average particle diameter $d_{50}$ of the blocked MDI mixture is at most 2 μm; and/or
    the particle diameter $d_{100}$ of the blocked MDI mixture is at most 6 μm; and/or
    the blocked MDI mixture has a number-average molar mass $M_n$ in the range of 550 to 1,200 g/mol.

11. A method for producing an adhesive reinforcing insert which comprises at least the following steps:
    a) providing at least one reinforcing insert;
    b) dipping the reinforcing insert in at least one dipping bath composition according to claim 1;
    c) drying the reinforcing insert from step b) at 100 to 240° C.; and
    d) annealing the reinforcing insert from step c) at 200 to 250° C.

12. The method according to claim 11, wherein:
    the reinforcing insert is selected from the group consisting of polyamide 6, polyamide 66, polyethylene terephthalate, polyethylene naphthalate, rayon, aramide, cotton, basalt fibres, sisal, hemp, flax, coconut fibres, and mixtures thereof.

13. The method according to claim 11, wherein:
    the reinforcing insert is dipped, before step b), in an aqueous, solids-containing dipping bath composition which comprises at least one blocked MDI mixture or which comprises no other components besides the at least one blocked MDI mixture,
    the MDI mixture comprising MDI oligomers of formula (I), n being a whole number from 1 to 8,

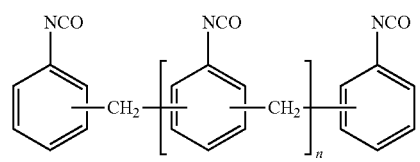

Formula (I)

and MDI monomers.

14. A method for producing a reinforced rubber product, which comprises the following steps:
    providing at least one layer of an adhesive reinforcing insert produced by the method according to claim 11;
    (ii) embedding at least one layer of an adhesive reinforcing insert from step (i) in a rubber matrix in a pressing mould;
    (iii) pressing the product from step (ii);
    (iv) vulcanising the product from step (iii) at 140 to 210° C. and 5 to 110 bar for 5 to 45 minutes; and (v) removing the reinforced rubber product from step (iv) from the pressing mould.

15. An adhesive reinforcing insert produced by the method according to claim 11.

16. A method of producing reinforced rubber products comprising utilizing the adhesive reinforcing insert according to claim 15.

17. A method for coating reinforcing inserts for rubber products comprising utilizing the aqueous, solids-containing dipping bath composition according to claim 1.

* * * * *